United States Patent [19]

Karagoz et al.

[11] Patent Number: 4,689,799
[45] Date of Patent: Aug. 25, 1987

[54] SCALLOPED NIPPLE FOR WATER-COOLED ELECTRODES

[76] Inventors: Berch Y. Karagoz, 3487 Greenway Rd., Grand Island, N.Y. 14072; Lyman T. Moore, 633-38th St., Niagara Falls, N.Y. 14301; Joseph M. Rua, 255 S. Niagara St., Tonawanda, N.Y. 14150; Mark D. Travers, 5988 Walmore Rd., Sanborn, N.Y. 14132; Donald P. Allen, 6249 Kay Ellen Dr., Niagara Falls, N.Y. 14305

[21] Appl. No.: 781,062

[22] Filed: Sep. 27, 1985

[51] Int. Cl.[4] ............................................. H05B 7/14
[52] U.S. Cl. ...................................... 373/93; 373/91
[58] Field of Search .................... 373/88, 90, 91, 92, 373/93

[56] References Cited

U.S. PATENT DOCUMENTS 4,168,392  9/1979  Prenn ..................................... 373/93
4,513,425  4/1985  Karagoz et al. ....................... 373/90

Primary Examiner—Roy N. Envall, Jr.

[57] ABSTRACT

A water-cooled electrode for an electric arc furnace is fitted with a copper nipple 10, increased surface area through fluting or drilled or threaded passages for vastly improved cooling, joining the water-cooled and graphite portions of the electrode.

13 Claims, 15 Drawing Figures

GROOVED
PERATRODE NIPPLE
SINGLE
HELIX

GROOVED
PERMTRODE NIPPLE
QUADRUPLE
HELIX

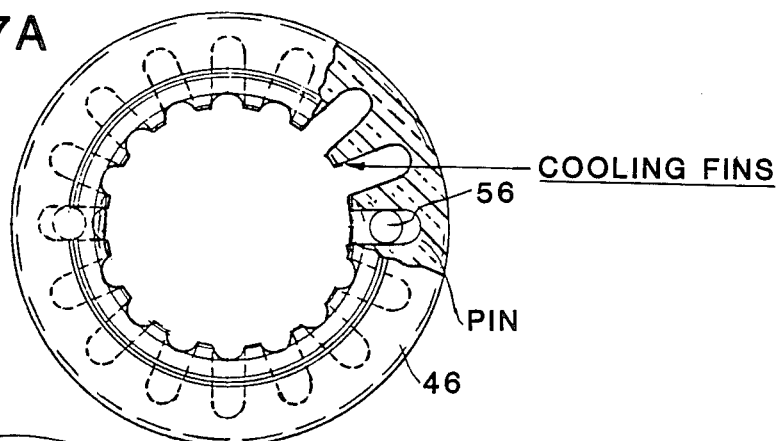
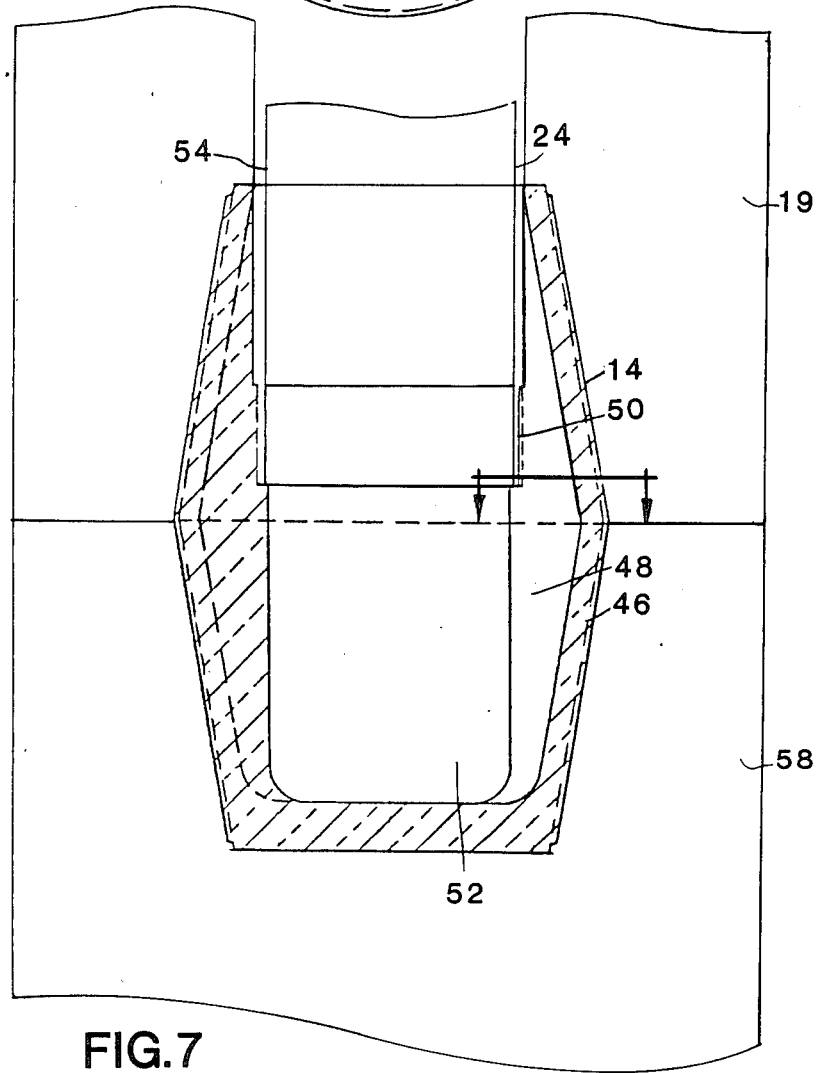
FIG. 7A
FIG. 7

SCALLOPED NIPPLE FOR WATER-COOLED ELECTRODES

RELATED APPLICATIONS

This application is related to U.S. Pat. No. 4,490,824, U.S. Pat. No. 4,513,425 and Ser. No. 573,704 filed Jan. 25, 1984, which are incorporated herein by reference.

BACKGROUND OF THE INVENTION

1. Field of the Invention

The invention relates generally to an electrode for arc furnaces, and particularly to a nipple configuration for a composite electrode comprising a liquid-cooled upper section and a graphite lower section joined to the upper section.

2. Previous Developments in the Art

The conventional material employed for the fabrication of electrodes for arc furnaces is graphite. These electrodes are consumed in use due to erosion and corrosion caused by oxidation, vaporization, spalling and other factors. This consumption involves tip losses, column breakage losses and particularly side oxidation losses. An average electric furnace consumes four to eight kilograms of graphite per ton of steel produced.

One method for reducing the consumption of graphite electrodes in arc furnaces has been the application of a protective coating or cladding material to the electrodes with oxidation resistant materials. However, due to the nature of graphite, formidable problems have been experienced regarding the wetting of the electrodes with such coatings, thereby rendering them somewhat ineffective for their stated purpose. Concerning claddings, the dissimilar thermal expansion and other properties of graphite and the cladding material tend to cause damage or slippage of the cladding and/or electrode.

Another known means for reducing graphite electrode consumption involves the utilization of fully non-consumable electrode systems. The systems employ full length liquid-cooled electrodes with selected apparatus to protect the electrode tip from the extreme temperatures of the arc. Although such systems appear in the patent literature, this design has not been commercially successful.

It has been suggested heretofore that composite electrodes comprising carbon or graphite portions attached to a water-cooled upper piece would provide means for reducing electrode consumption in arc furnaces. A number of patents have issued on specific composite electrode designs. For example, U.S. Pat. Nos. 2,471,531 to McIntyre et al,; 3,392,227 to Ostberg; 4,121,042 and 4,168,392 to Prenn; 4,189,617 and 4,256,918 to Schwabe et al.; 4,287,381 to Montgomery and 4,416,014, 4,417,344 and 4,451,926 to Hogg et al. relate to liquid cooled composite electrodes for arc furnaces. Likewise, European patent application Nos. by C. Conradty Nurnberg designated 50,682, 50,683 and 53,200 and 77,513 by Von Roll AG are directed to composite electrode configurations.

OBJECTS OF THE INVENTION

During use in an arc furnace, a composite electrode must transmit extremely high electrical current. Any localized areas of high electrical resistance will result in resistive heating at that point, with subsequently increased thermal stresses possibly contributing toward ultimate failure of a segment of the composite electrode in the heated region. One particularly troublesome area where this problem is experienced is at the joint area at which the permanent of semipermanent section is connected to the consumable section.

It is an object of this invention to provide a composite electrode system for arc furnaces with enhanced thermal conductivity and strength in order to maintain the physical integrity needed for reliable, safe and economical operation of an electric arc furnace.

SUMMARY OF THE INVENTION

The invention is a nipple for use in a water-cooled electrode for electric arc furnaces. It is specifically designed for use with the composite electrodes disclosed in U.S. Pat. Nos. 4,490,824 and 4,513,425 and Ser. No. 573,704 and as such these disclosures are incorporated by reference herein. However, it may also be used with other types of water-cooled electrodes, such as those disclosed in the Previous Developments in the Art above.

Water-cooled electrodes for arc furnaces of the type referenced above have an upper water-cooled section or sections connected to one or more graphite tip electrodes by a nipple. The nipple is usually biconical abut may also be conical only in the lower section connecting to the graphite socket.

For maximum thermal conductivity, copper is the most favored material of construction, with a large surface area exposed to the cooling medium by way of fluting or drilling, to achieve a drastically increased amount of cooling in this critical region.

DESCRIPTION OF THE DRAWINGS

FIGS. 7 and 7A also show a version suitable for use in the invention of U.S. Pat. No. 4,513,425.

DESCRIPTION OF THE PREFERRED EMBODIMENT

Figure 1A:
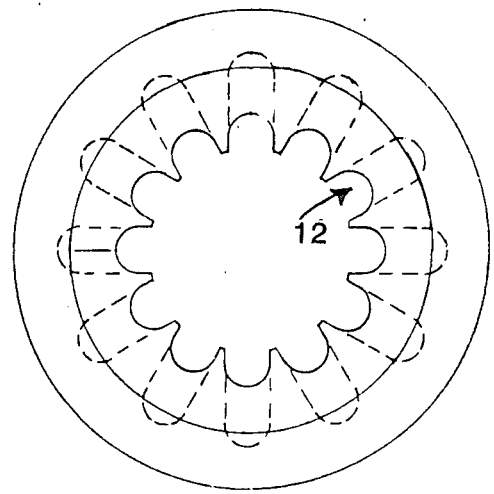
FIGS. 1 and 1A depict the basic version of the invention in vertical and horizontal section.
Figure 1:
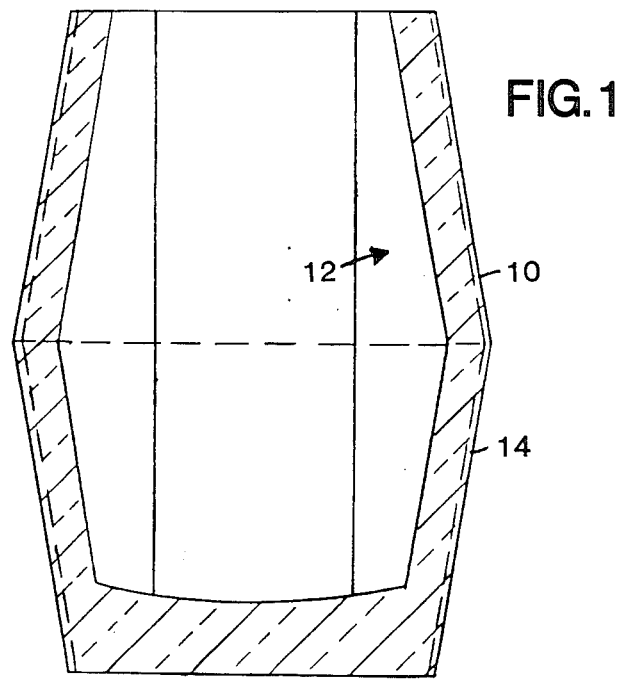

FIG. 1 shows a basic version of the nipple 10. The nipple itself is copper for maximum thermal conductivity, machined either from a casting or a solid billet. In small furnaces or those of lower current flow, aluminum, brass, bronze, iron or steel may be used, but where high performance is required, we have found that copper is by far the most suitable material. The interior of the nipple is fluted 12 and has exterior threads 14. FIG. 1A is a cross-section.

Figure 2A:
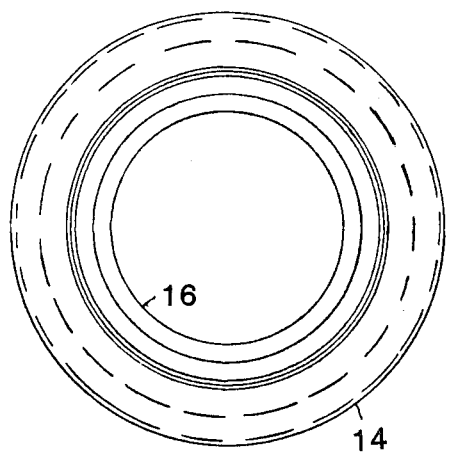
FIGS. 2 and 2A are of a nipple with a single helix interior thread.
Figure 2:
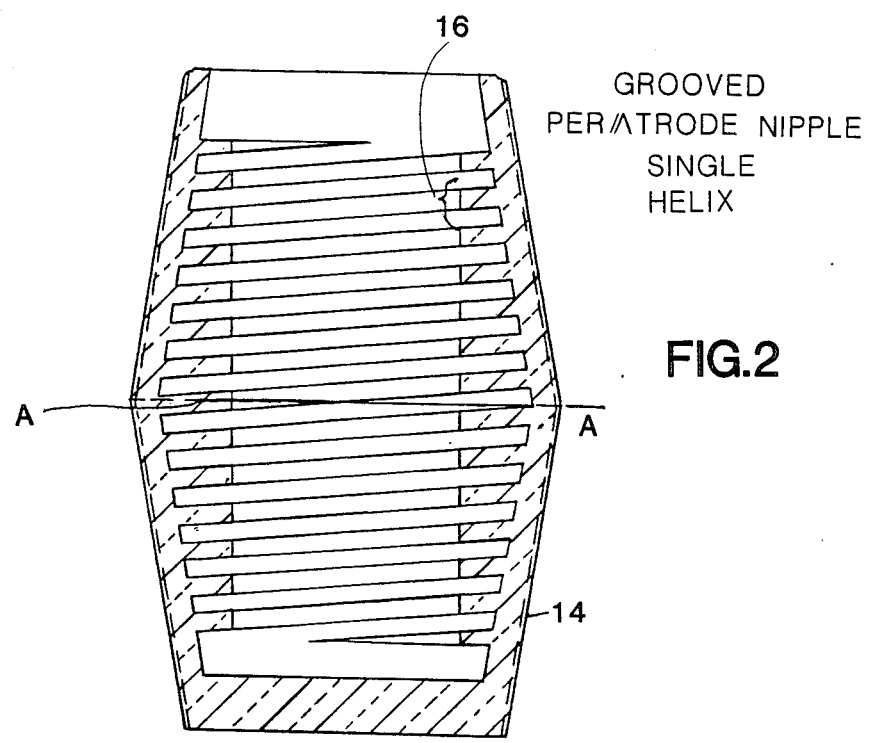
Figure 3A:
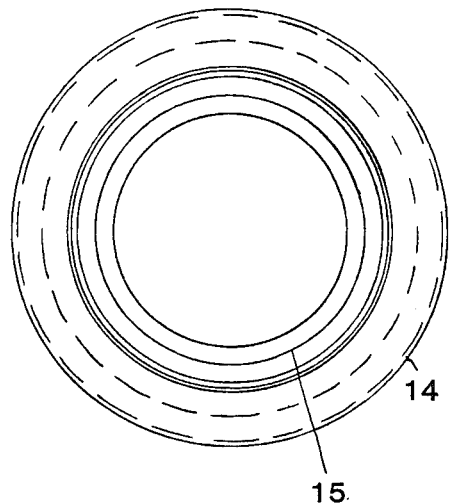
FIGS. 3 and 3A are of a nipple with a quadruple helix.
Figure 3:
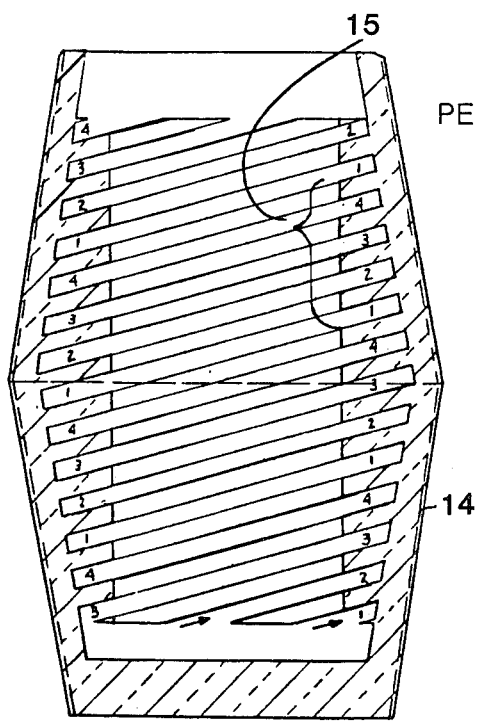

FIG. 2 shows a grooved nipple 13 with a single helix interior thread 16, FIG, FIG. 2A is an cross-section at AA of the nipple. FIGS. 3 and 3A are similar views of a nipple 17 with a quadruple groove helix 15 for maximum water flow.

Figure 4:
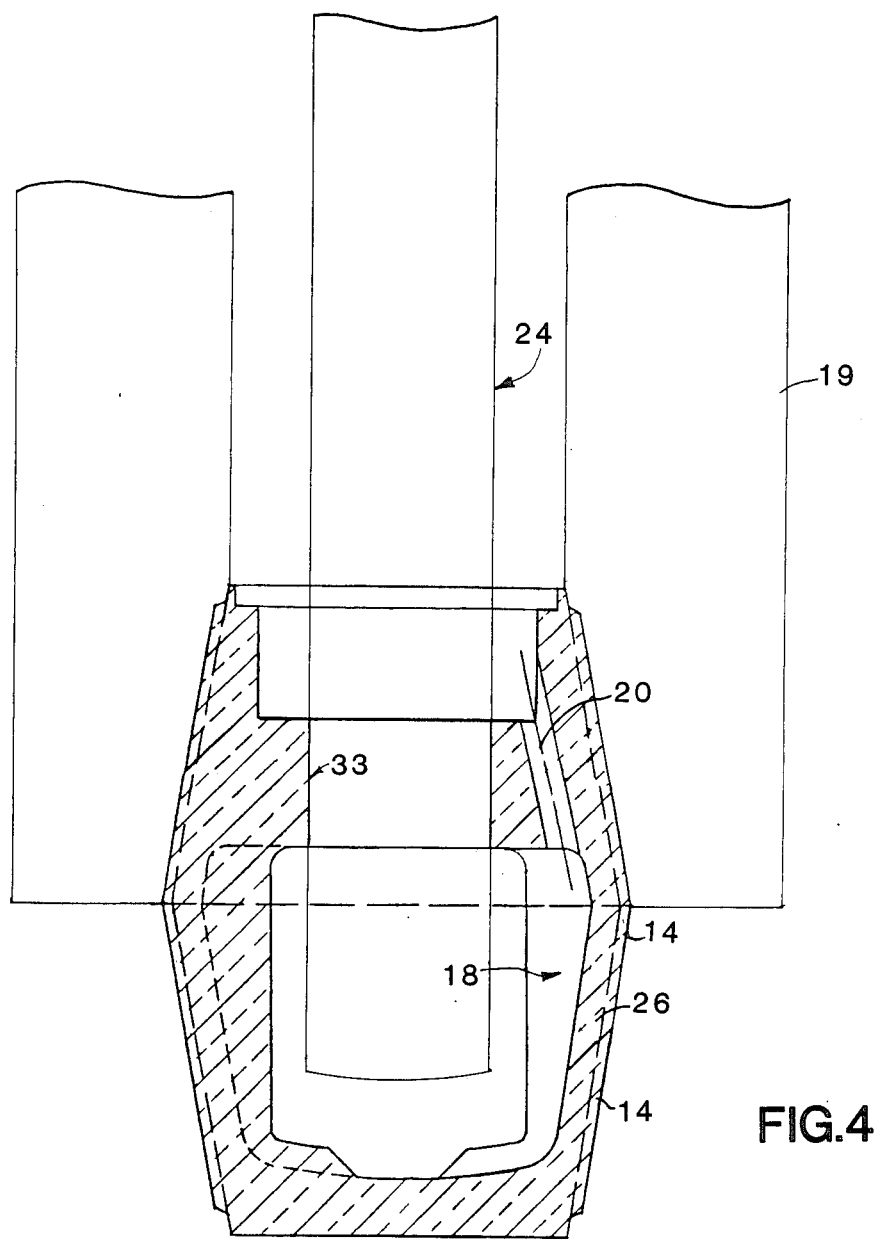
FIG. 4 is a version of the nipple for use in the invention disclosed in U.S. Pat. No. 4,513,425.

FIG. 4 is a version of the basic nipple adapted for use in the electrode of U.S. Pat. No. 4,513,425. Fluting 18 is connected by passages 20 to the annulus between the electrode body 19 and the central water supply pipe 24, which is attached to the nipple 26 through threads 33, applying an upward force to the nipple and holding the electrode in compression.

Figure 5:
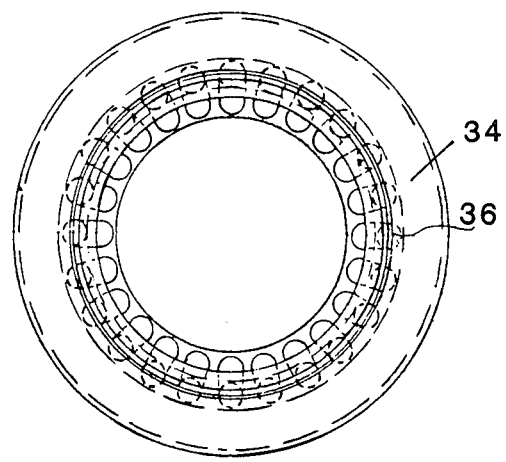
FIGS. 5, 5A, 6 and 6A show a nipple with drilled water passages.
Figure 5A:
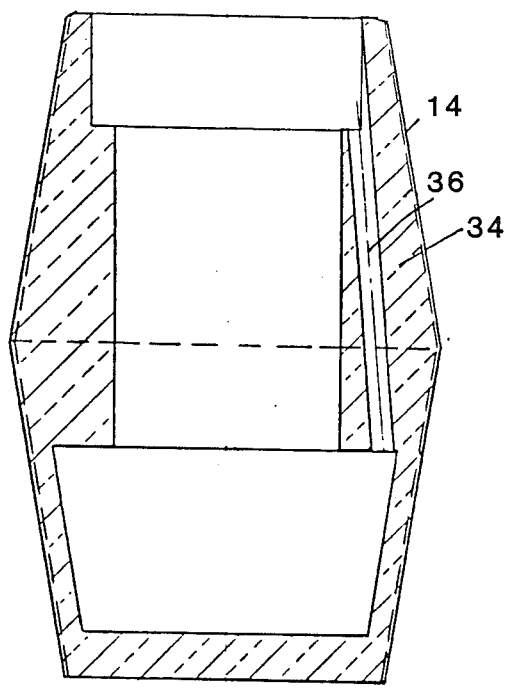

FIGS. 5 and 5A in cross-sections shows a nipple 34 with drilled passages 36.

Figure 6A:
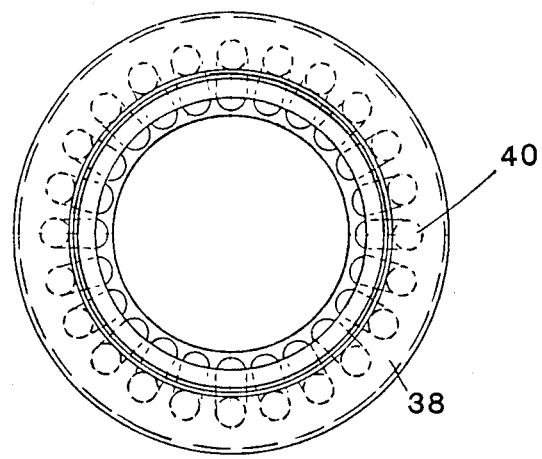
Figure 6:
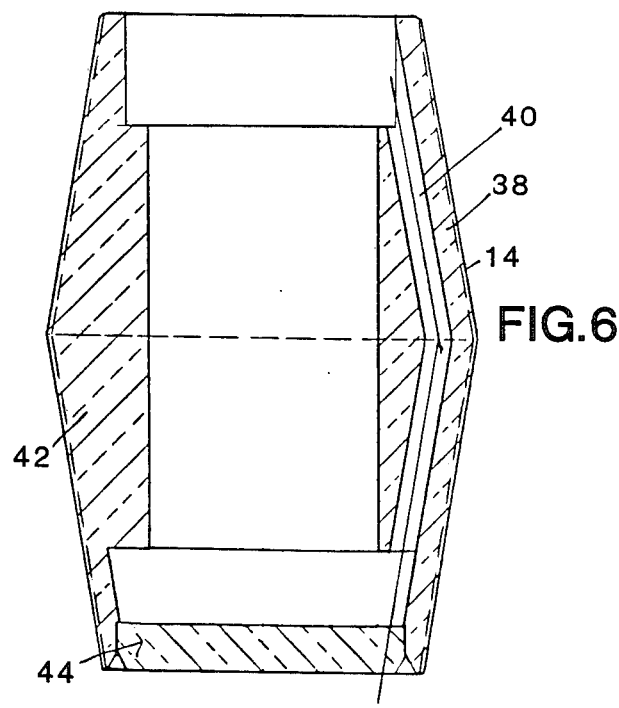

FIGS. 6 and 6A in cross-section show a version 38 of the basic invention which has double-drilled passages 40. This version of the invention is made from a billet or casting 42 open at both end which is drilled and then closed with plug 44.

FIGS. 7 and 7A in a cross-section show a nipple 46 with full-length flutes 48 suitable for use in the prestressed electrode described in U.S. Pat. No. 4,513,425. Water supply pipe 24 is attached to the nipple by threads 50. Water enters the cavity 52 from pipe 24 and returns through the flutes 48 to annulus 54 between the pipe 24 and electrode 19. FIG. 7A shows also provision for pins 56 which are set in a hole drilled through both the nipple and electrode socket to prevent any movement of the joint in operation. Tip electrode 58 is normally a solid graphite electrode but may also be a used body 19.

Figure 8:
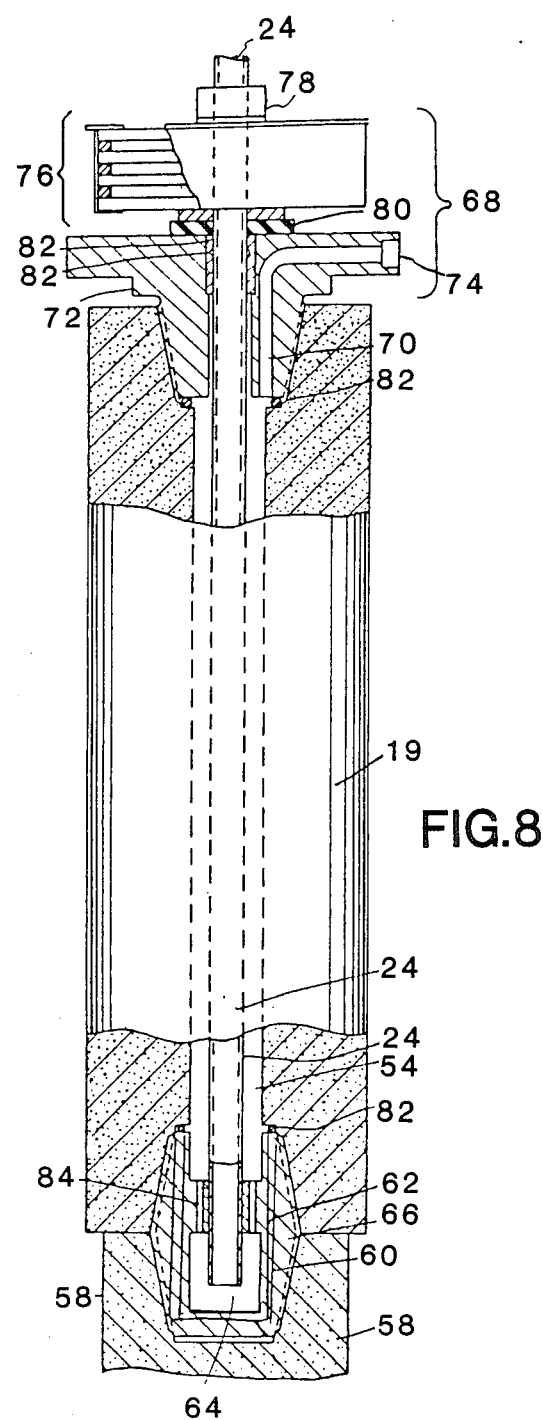
FIG. 8 shows the invention in a full electrode.

FIG. 8 shows a nipple of the invention in the electrode described in U.S. Pat. No. 4,513,424, with full length flutes 62 as shown in FIG. 7. Water enters supply pipe 24, entering the cavity 64 in nipple 66, then passing through flutes 62 to annulus 54 to header assembly 68, passages 70 in half-nipple 72 to outlet 74. Body 19 is held in compression by tension applied to pipe 24 between nipple 66 and Belleville washer assembly 76 held by nut 78.

Dielectric material washer 80 isolates the column electrically. O-rings 82 seal the electrode. Spider 84 in this instance attaches the nipple to the water supply pipe.

The nipple is preferably silver-plated copper for maximum thermal and electrical conductivity and protection against oxidation.

Figure 9:
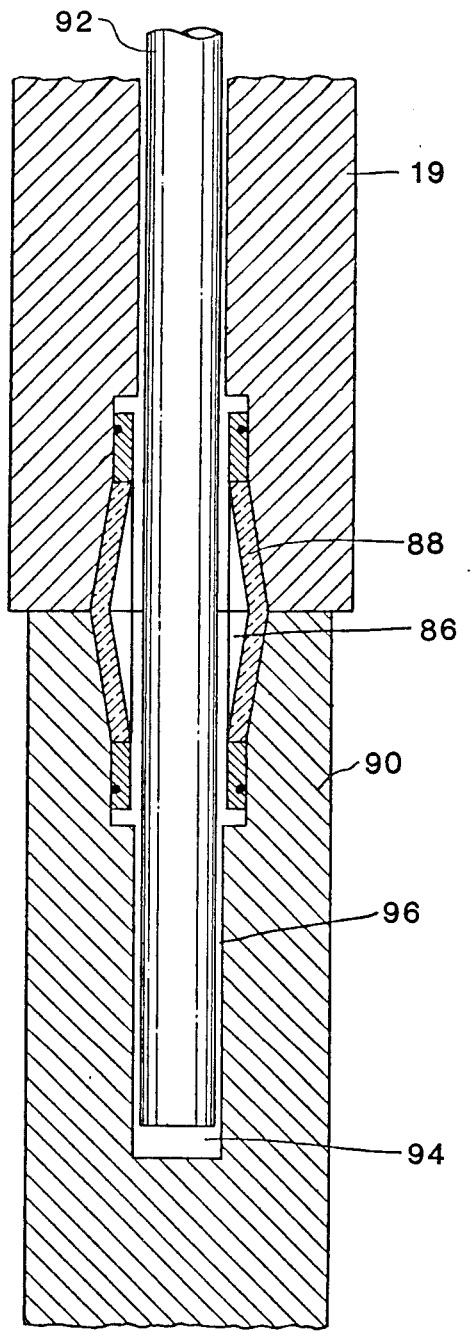
FIG. 9 shows the invention in use in a version of an electrode disclosed in Ser. No. 573,704.

FIG. 9 shows a fluted nipple in a flow-through version as shown in Ser. No. 573,704. Fluting 86 in nipple 88 aids in cooling the joint between tip electrode 90 and composite electrode body 19. Water flows in through supply pipe 92 to counterbore 94 in electrode 90 and returns through annulus 96 to nipple 88 and electrode body 19 and back to the header (not shown). The nipple of FIG. 6 without plug 44 may also be used in this version of the invention.

Detailed Description Of The Invention

A copper nipple without extra surface area, having a plain interior was installed at the lower end of a composite 16 in. (40 cm) water-cooled electrode, of the type disclosed in U.S. Pat. No. 4,490,824, joining a 14 in. (36 cm) solid graphite tip electrode. This installation operated in an electric steel shop for some 40 heats before failure due to a side arc caused by a socket split. The socket split was apparently due to nipple overheating and the consequent thermal expansion. The plain nipple was replaced with a fluted interior nipple with the result that cooling was improved and there were no more socket splits due to overheating. In this test the furnace had water-cooled electrodes on three phases and was in a shop making principally concrete reinforcing rod and similar bar stock.

The nipple is usually in the same shape as the graphite nipples normally used in electric arc furnaces, that is a double frusto-conical shape threaded to match the standard electrode socket. Where the nipple is to be used with an expendable graphite tube, as disclosed in U.S. Pat. No. 4,490,824 it will need to match both the upper and lower sockets. In instances where the nipple is to be used in a permanent-type water-cooled electrode, such as those by Von Roll described above, that limitation may not be necessary and the upper portion could be of any practical shape. The lower half would still most necessarily have a standard frusto-conical shape to match the electrode tip.

Where the electrode is a prestressed design as disclosed in U.S. Pat. No. 4,513,425, the nipple is attached to the central water supply pipe and some means are necessary to provide for water flow past the point of attachment. This may be by means of drilled holes or other passages in the body of the nipple, or by means of a spider arrangement attaching the water supply pipe to the nipple.

The nipple is preferably silver-plated to improve thermal and electrical conductivity and to prevent oxidation of the base metal, particularly where an oxidizing metal is used for the nipple, e.g. copper.

We claim:

1. In a composite water-cooled arc furnace electrode comprising an upper electrode body having cooling means therein and a threaded socket in one end thereof, a graphite lower electrode body having a threaded socket in at least one end thereof joined in abutting relationship to said upper electrode body by a hollow threaded nipple, said hollow nipple being open at one end and having a water supply pipe therein, the improvement wherein the interior surface of said hollow nipple includes means which provide an increase surface area for contact by water as compared to said nipple having a plain interior whereby the cooling efficiency of said water is increased.

2. The electrode according to claim 1, wherein the hollow nipple is fabricated of copper.

3. The electrode of claim 1 wherein the hollow nipple is in the shape of a double truncated cone with the largest diameter at the center of the hollow nipple and equal smaller diameters at the ends of the hollow nipple.

4. A threaded hollow nipple for joining the abutting ends of a liquid-cooled upper electrode section and a graphite lower electrode section of a composite arc furnace electrode, said hollow nipple having an interior surface of scalloped configuration to provide increased surface area.

5. A threaded hollow nipple for joining the abutting ends of a liquid-cooled upper electrode section and a graphite lower electrode section of a composite arc furnace electrode, said hollow nipple having an interior surface of finned or fluted configuration to provide increased surface area.

6. The electrode of claim 2 wherein the water supply pipe is attached to the nipple and is placed in tension between a header at the upper end of the electrode, said nipple having a plurality of passages for coolant flow past the point of attachment of said tube and nipple.

7. In a composite water-cooled arc furnace electrode comprising an upper electrode body having cooling means therein and a threaded socket in one end thereof, a graphite lower electrode body having a threaded socket in at least one end thereof joined in abutting relationship to said upper electrode body by a hollow threaded nipple, said hollow nipple being open at one end and having a water supply pipe therein, the improvement wherein the interior surface of said hollow nipple is of a configuration providing increased surface area for contact by water as compared to said nipple having a plain interior whereby the cooling efficiency of said water is increased wherein the means providing increased surface area comprise helical ribs.

8. The electrode of claim 1 wherein the upper electrode body is held in compression by tension applied to the water supply pipe between the header at the upper end of said body and the nipple.

9. The electrode of claim 1 wherein the nipple is silver-plated.

10. In a composite water-cooled arc furnace electrode comprising an upper electrode body having cooling means therein and a threaded socket in one end thereof, a graphite lower electrode body having a threaded socket in at least one end thereof joined in abutting relationship to said upper electrode body by a hollow threaded nipple, said hollow nipple being open at one end and having a water supply pipe therein, the improvement wherein the interior surface of said hollow nipple is of a configuration providing increased surface area for contact by water as compared to said nipple having a plain interior whereby the cooling efficiency of said water is increased wherein the increased surface area comprises enclosed passages within the nipple.

11. A water-cooled composite electrode for an electric arc furnace comprising a header assembly having water inlet and outlet and tension-applying means attached to a water supply pipe, a tubular graphite electrode body having tapered truncated threaded sockets at each end, the inner bore in said body having an outer diameter not larger than the bottom of said sockets, said water supply pipe in said inner bore having a smaller outer diameter than said inner bore, said water supply pipe attached to a hollow nipple on the bottom of said body having increased interior surface area for contact by water as compared to said nipple having a plain interior whereby the cooling efficiency of said water is increased, said water supply pipe placed in tension between said nipple and said tension-applying means, said increased surface area means comprising fluting in the body of said nipple, and a second graphite electrode component attached to said nipple and dependent therefrom.

12. The electrode of claim 11 wherein the nipple is closed at its lower end and the water supply pipe terminates in the cavity in said nipple, cooling water entering the electrode through the water supply pipe, flowing into the nipple, through the nipple, into the annulus between the water supply pipe and the inner bore of the electrode body, into a passage in the header, and out of an outlet from the electrode.

13. The electrode of claim 11 wherein the nipple is hollow and open at both ends, the water supply pipe traversing the body and the nipple and opening into a counterbore in the second electrode, the cooling water flowing through the water supply pipe, into the counterbore in the tip electrode, through the annulus between the water supply pipe and the tip electrode counterbore, through the fluting or passages in the nipple into the annulus between the water supply pipe and the electrode body, into the passages in the header, and out of the electrode.

* * * * *